United States Patent [19]

Steenken

[11] 4,087,510

[45] May 2, 1978

[54] PROCESS FOR EXTRACTING METALS FROM SPENT DESULPHURIZATION CATALYSTS

[75] Inventor: Gerhard E. W. K. Steenken, Berzbuir, Germany

[73] Assignee: Akzona Incorporated, Asheville, N.C.

[21] Appl. No.: 642,217

[22] Filed: Dec. 18, 1975

[30] Foreign Application Priority Data

Dec. 19, 1974  Netherlands ............................ 7416555

[51] Int. Cl.$^2$ ...................... C01G 39/00; C01G 31/00
[52] U.S. Cl. ......................................... 423/53; 423/61; 423/62; 423/68; 423/119; 423/593
[58] Field of Search .................... 423/61, 68, 53, 62; 75/121

[56] References Cited

U.S. PATENT DOCUMENTS

| 2,187,750 | 1/1940 | Marvin | 423/61 |
|---|---|---|---|
| 2,367,506 | 1/1945 | Kissock | 423/55 |
| 3,206,276 | 9/1965 | Berwell et al. | 423/68 |
| 3,300,276 | 1/1967 | Bretschneider et al. | 423/68 |
| 3,486,842 | 12/1969 | Michal | 423/68 |
| 3,725,524 | 4/1973 | Martin et al. | 423/61 |
| 3,773,890 | 11/1973 | Fox et al. | 423/61 |
| 3,856,512 | 12/1974 | Palmer et al. | 423/61 |

*Primary Examiner*—Herbert T. Carter
*Attorney, Agent, or Firm*—Francis W. Young; Robert F. Green

[57] ABSTRACT

Vanadium and molybdenum are recovered from a spent desulfurization catalyst containing the same by a process involving intimately admixing with comminuted catalyst an amount of a solid alkali metal carbonate, such as calcined sodium carbonate, sufficient to convert the vanadium and molybdenum present into water-soluble compounds, heating the mixture in the solid state in the presence of air at a temperature between about 650° C and about 850° C for a period of about 1 to 2 hours, and extracting the vanadium and molybdenum compounds with water.

5 Claims, No Drawings

PROCESS FOR EXTRACTING METALS FROM SPENT DESULPHURIZATION CATALYSTS

BACKGROUND OF THE INVENTION

The present invention relates to a novel process for the extraction and recovery of vanadium and molybdenum, as well as cobalt and/or nickel, from a spent desulfurization catalyst.

Desulfurization catalysts are extensively used for the catalytic hydro-desulfurization of petroleum fractions having a sulfur content sufficiently high to produce atmospheric pollution when such fractions are burned as fuels. Treatment of the petroleum fraction with hydrogen at suitable temperatures and pressures in the presence of the catalyst results in the conversion of the sulfur to hydrogen sulfide, which may be recovered. As a result of this treatment, the desulfurized fractions can be used as clean fuels, which produce little or no air pollution.

The conventional desulfurization catalysts, in their freshly prepared state, comprise an aluminum oxide carrier upon which there are deposited compounds of molybdenum and cobalt as the active ingredients. In the course of the desulfurization some of the hydrogen sulfide formed reacts with the catalyst components to form sulfur-containing metal compounds, such as metal sulfides. During desulfurization, moreover, the catalyst gradually takes up vanadium and nickel from the petroleum until these and other impurities have so reduced the activity of the catalyst that insufficient desulfurization takes place and the spent catalyst must be replaced with fresh catalyst.

The spent catalyst therefore may contain in vanadium, molybdenum, cobalt and nickel, as well as aluminum oxide. These metals may be recovered for re-use, either in the preparation of fresh catalyst, or for other industrial purposes. Various methods have been proposed in the prior art for the extraction and recovery of the catalyst components.

In Japanese Patent Specification 47-31892 there is disclosed a two-stage process in which the spent catalyst is first oxidatively roasted and the resulting product, which contains the oxides of molybdenum, vanadium, cobalt and nickel, is mixed with an aqueous solution of sodium hydroxide, sodium carbonate, sodium bicarbonate, and the like, after which the mixture is calcined at a temperature above 600° C. These alkaline decomposition agents are used in an amount which is 1.2 to 1.5 times the theoretical amount needed to convert vanadium and molybdenum into water-soluble salts, such as sodium vanadate $NaVO_3$, and sodium molybdate $Na_2MoO_4$. The greatest disadvantages of this method are the cumbersome two-stage procedure, and the problem of roasting gas disposal (emission of sulfur dioxide) presented by the first stage. By using an oxidative roasting stage in treating such a spent desulfurization catalyst, however, the environmental advantages obtained by the desulfurization of the petroleum fractions are partly undone unless costly provisions are made for controlling undesirable sulfur dioxide emissions.

GENERAL DESCRIPTION OF THE INVENTION

In accordance with the present invention, there is provided a process which obviates the need for the uneconomical two-stage procedure of the prior art, with its attendant air pollution. It has been found, surprisingly, that the oxidative roasting stage can be omitted if the treatment with alkaline decomposition agents in the second stage is carried out with a sufficiently large amount of a solid alkali metal carbonate in the presence of air. Thus, in accordance with the invention, the spent desulfurization catalyst is treated with the solid alkaline decomposition agent at elevated temperature, the resulting product is leached with water, the resulting solution, which contains vanadium and molybdenum, is separated from the cobalt and/or nickel containing residue, and the solution and the residue are then further processed to recover the metal values.

More particularly, in accordance with the process of the invention, the spent desulfurization catalyst, without previous oxidative roasting, is intimately mixed with solid alkali metal carbonate in an amount which is sufficiently large to convert the sulfur, vanadium, and molybdenum present into water-soluble compounds, and the mixture, while in the solid state, is heated for a period of about 1 to about 2 hours at a temperature in the range of about 650° C to about 850° C, in the presence of air.

The amount of alkali metal carbonate required for practically complete conversion of the sulfur, vanadium and molybdenum present can be calculated on the basis of an accurate anaylsis of the spent catalyst composition or, as described hereinafter, can be established experimentally in a simple and accurate manner. The compositions of spent desulfurization catalysts may, of course, vary with the starting composition of the fresh catalyst, and the composition of the hydrocarbon feed treated. The process conditions under which the hydro-desulfurization is carried out also plays a part.

A typical average composition of spent cobalt-molybdenum-aluminum oxide catalyst, often occurring in actual practice is shown in the following Table A:

TABLE A

Average Composition of Spent Co—Mo—Al Catalyst

| Constituent | Per Cent by Weight |
| --- | --- |
| Aluminum Oxide | 35 – 37 |
| Hydrocarbon Oil (extractable with heptane or benzene) | 16 – 18 |
| Sulfur | 13 – 14 |
| Carbon | 12 – 15 |
| Vanadium | 8.4 – 8.8 |
| Molybdenum | 3.5 – 3.8 |
| Nickel | 2.6 |
| Cobalt | 2.0 |
| Silicon Dioxide | 1.0 |
| Iron | 0.1 |
| Titanium | 0.1 |

In the process according to the invention, there may be employed as alkali metal carbonate, any of the carbonates of sodium, potassium, lithium, rubidium or caesium. On economic grounds it is preferred to use the inexpensive sodium carbonate, for example in the form of calcined soda having an $Na_2O$ content of about 47% to 49% by weight.

In practice the weight ratio of spent catalyst to calcined soda is preferably in the range of 1:0.5 to 1:0.9. Thus, in the case of a spent catalyst having a composition as shown in Table A there is required per 1 kg of spent catalyst, about 0.06–0.7 kg of calcined soda having an $Na_2O$ content of about 47–49% by weight to convert 96–98% of the vanadium and 97–98% of the molybdenum into water-soluble compounds.

The catalyst-soda mixture must be heated in the presence of air for a period of 1 to 2 hours at a temperature in the range of about 650° to about 850° C., preferably in the range of about 750° to about 825° C. The process may be carried out statically (with a non-moving reaction mass) or dynamically (with a moving reaction mass).

The air is supplied in an amount varying from about 1 to about 10 Nm³/kg of spent catalyst. It is preferred to apply the air in an amount in the range of about 3 to about 5 Nm³/kg of spent catalyst. In the static procedure only about 7% of the sulfur contained in the spent catalyst will get into the effluent gases and in the (preferably used) dynamic procedure the proportion will be even as low as 2%. Calculated on the weight of the spent catalyst, about 1% by weight of sulfur (static procedure) and about 0.3% by weight of sulfur (dynamic procedure), respectively, will consequently be emitted as $SO_2$.

Per kg of spent catalyst having the composition given in Table A (13–14% by weight of sulfur), about 500 g of calcined soda are required for the bonding of the sulfur. Although this large amount of soda may seem uneconomical, a multiple compensation is obtained by the simplified one-stage procedure of the invention and the large saving in capital expenditure which would otherwise be required for the oxidative roasting stage and the purification of roasting gas.

The product which has been treated with alkali metal carbonate is extracted with water and the vanadium- and molybdenum-containing extract is separated from the residue. By adding ammonium chloride to the extract, the vanadium can be directly isolated in very pure state as ammonium vanadate $NH_4VO_3$. In the same way the molybdenum can be precipitated as ammonium tetramolybdate, by using hydrochloric acid at a pH of about 2.5.

After drying, the extraction residue contains about 40 to 42% by weight of the spent catalyst and mainly consists of $Al_2O_3$, CoO and/or NiO. Calculated on the spent catalyst, the vanadium content of the residue is only about 0.4% by weight and the molybdenum content about 0.2% by weight. From the residue, aluminum, cobalt and/or nickel can be recovered by conventional methods, for example by the method described in German Offenlegungsschrift No. 2,316,837. This method involves treating the residue with sodium hydroxide solution in an autoclave at elevated temperature for a sufficient period of time for the aluminum to be brought completely into solution as sodium aluminate. Thereafter the mixture is filtered, and aluminum hydroxide precipitated from the solution by acidification to a pH of about 4 to 7. This can be calcined to aluminum oxide for use in preparing fresh catalyst. The cobalt and/or nickel are recovered from the residue, for example, by reduction of the oxides thereof with hydrogen, leaching with sulfuric acid, and separating the cobalt as a cobalt-amine complex, or similarly the nickel, from which the respective metals may be obtained by hydrogen reduction.

DESCRIPTION OF THE PREFERRED EMBODIMENTS

The following examples serve to illustrate the practice of the invention, but are not to be regarded as limiting:

EXAMPLE 1

A spent cobalt-molybdenum-aluminum oxide desulfurization catalyst having the composition: $Al_2O_3$ 35%, extractable hydrocarbon oil 16%, sulfur 13%, carbon 12%, vanadium 8.4%, molybdenum 3.5%, nickel 2.6%, cobalt 2.0%, $SiO_2$ 1.0%, iron 0.1%, and titanium 0.1%, was prepared in a series of 1 kg samples, after preliminary grinding. After mixing with various ratios of calcined soda (48% by weight $Na_2O$), the samples were ground again. The catalyst is ground into a sufficientl small particle size, so that upon admixture with the soda, the color of the mixture will be a uniform black to dark grey.

In this manner for the experimental determination of the amount of soda required, according to the present invention, catalyst-soda mixtures were prepared which respectively contained 0.8, 0.7, 0.6, 0.5, 0.4 and 0.3 parts by weight of soda to one part by weight of spent catalyst.

For each experiment, starting from 20 g of spent catalyst, mixtures with 16, 14, 12, 10, 8 and 6 g of calcined soda were prepared, which were spread over 2 ceramic plates in a layer thickness of 5 mm, the various mixtures being spaced at 2–3 cm intervals. The mixtures were heated in the presence of air (about 4 liters of air per g. of spent catalyst) in a muffle furnace for 2 hours at 800° C, evaluated visually, treated as described above by extraction with water, separating the vanadium- and molybdenum extract by filtration, and adding ammonium chloride solution to convert these oxides to ammonium salts.

The results are summarized in the following Table B. In the table the (dry) residue of the extraction with water is expressed as a percent by weight of the spent catalyst. The pH values are indicated for the suspension (left hand figures) and for the clear filtered extract (right hand figures). The percentages of vanadium and molybdenum in the residue are based on the weight of the dry residue. The percentages of undissolved vanadium and molybdenum are calculated on the amounts of V and Mo contained in the untreated catalyst.

From the percentages of V and Mo in the residue (columns 6 and 7) it follows that in the case of this spent catalyst the amount of soda should not be less than that used for mixture 3. As to mixture 1, however, the percentage extraction residue (35.0) shows that too much soda was used as a result of which an appreciable amount of aluminum oxide went into solution. Thus, the correct catalyst/soda ratio is in the range of 1:0.6 to 1:0.7 (mixtures 2 and 3). As the yield of vanadium and molybdenum for mixture 2 is only slightly higher than that for mixture 3, it will for economic reasons by preferred to use the ratio 1:0.6 (mixture 3).

Visual observation of the alkali metal carbonate treated products leads to the conclusion that if their color is a pure blue, vanadium and molybdenum can be extracted almost completely. The lower limit of the soda proportion to be used is reached Table B

| Mixture No. | Weight ratio cat./soda | Colour of roasted product | Extraction residue % | pH values | in residue % V | in residue % Mo | nondissolved % V | nondissolved % Mo |
|---|---|---|---|---|---|---|---|---|
| 1 | 1 : 0.8 | pure blue | 35.0 | 10.9–11.0 | 0.23 | 0.23 | 0.96 | 2.30 |
| 2 | 1 : 0.7 | pure blue | 41.8 | 9.1–9.6 | 0.80 | 0.20 | 3.98 | 2.39 |
| 3 | 1 : 0.6 | blue with green haze | 40.5 | 7.1–7.8 | 0.87 | 0.27 | 4.19 | 3.12 |
| 4 | 1 : 0.5 | green with blue spots | 40.3 | 5.8–6.2 | 2.3 | 0.76 | 11.0 | 8.75 |
| 5 | 1 : 0.4 | pure green | 41.4 | 5.7–5.8 | 2.5 | 1.1 | 12.3 | 13.0 |
| 6 | 1 : 0.3 | brown with green edge | 43.3 | 3.8–3.8 | 5.8 | 2.1 | 29.9 | 26.0 | when the product is no longer a pure blue. Green roasted products contain too little soda.

The correct mixing ratio can be established far more accurately - particularly in view of the going into solution of aluminum oxide - by determining the pH value of the clear (filtered) extract (column 5, right-hand figures). The pH value of the filtered solution must be higher than 7.5 but lower than 10.0.

By using a mixing ratio of 1:0.65 a practically complete extraction of vanadium and molybdenum is assured, and the extraction solution will still be so weakly alkaline then that aluminum oxide can go into solution in only very small quantities (1–2%).

What is claimed is:

1. A process for the extraction of vanadium and molybdenum from a spent desulfurization catalyst containing the same, and having an aluminum oxide carrier, said spent catalyst not having been subjected to previous oxidative roasting, comprising the steps of:
    (a) intimately admixing comminuted spent catalyst with an amount of a solid alkali metal carbonate sufficient to convert the vanadium, molybdenum, and any sulfur which may be present, into water-soluble compounds;
    (b) heating the mixture produced in step (a) in the solid state in the presence of air at a temperature between about 650° C and about 850° C for a period between about 1 and about 2 hours; and
    (c) leaching the product of step (b) with water to dissolve the vanadium and molybdenum compounds and recovering said compounds from the extract;

the amount of solid alkali metal carbonate also being sufficient so that the extract of step (c), after filtration, has a pH higher than 7.5 but lower than 10.0.

2. The process of claim 1 in which the alkali metal carbonate is sodium carbonate.

3. The process of claim 1 in which the ratio of spent catalyst to alkali metal carbonate, by weight, is in the range of about 1:0.5 to about 1:0.9.

4. The process of claim 1 in which the proportion of air supplied in step (b) is between about 1 and about 10 Nm$^3$/kg of spent catalyst.

5. The process of claim 1 in which the heating temperature range in step (b) is from about 750° to about 825° C.

* * * * *